United States Patent
Tomi et al.

(10) Patent No.: US 12,460,777 B2
(45) Date of Patent: Nov. 4, 2025

(54) METHOD FOR DISCONNECTING GAS TANK

(71) Applicant: TOYOTA JIDOSHA KABUSHIKI KAISHA, Toyota (JP)

(72) Inventors: Naoki Tomi, Kawasaki (JP); Yoshikatsu Fujimura, Toyota (JP); Keiichi Kaneko, Mishima (JP); Tetsuya Tonosako, Fuji (JP); Kei Kato, Nagakute (JP); Tomoki Nakashima, Nagoya (JP); Koji Sugiura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/976,734

(22) Filed: Dec. 11, 2024

(65) Prior Publication Data

US 2025/0290605 A1   Sep. 18, 2025

(30) Foreign Application Priority Data

Mar. 12, 2024   (JP) .................. 2024-037991

(51) Int. Cl.
 *F17C 13/08* (2006.01)

(52) U.S. Cl.
 CPC ...... *F17C 13/08* (2013.01); *F17C 2205/0153* (2013.01); *F17C 2221/011* (2013.01); *F17C 2221/012* (2013.01); *F17C 2227/041* (2013.01); *Y10T 29/4973* (2015.01); *Y10T 29/49776* (2015.01)

(58) Field of Classification Search
 CPC ............. F17C 13/08; F17C 2205/0153; F17C 2221/011; F17C 2221/012; F17C 2227/041; Y10T 29/4973; Y10T 29/49776
 See application file for complete search history.

(56) References Cited

U.S. PATENT DOCUMENTS

| 8,459,399 B2 * | 6/2013 | Ohashi | B60L 7/16 180/312 |
| 2006/0065214 A1 * | 3/2006 | Flessner | F02M 26/35 123/3 |
| 2006/0118175 A1 * | 6/2006 | Mathison | F17C 5/04 137/256 |
| 2009/0272590 A1 | 11/2009 | Kim et al. | |

(Continued)

FOREIGN PATENT DOCUMENTS

| JP | 2009-270707 A | 11/2009 |
| JP | 2023-056869 A | 4/2023 |

(Continued)

*Primary Examiner* — Jermie E Cozart
(74) *Attorney, Agent, or Firm* — SoraIP, Inc.

(57) ABSTRACT

In the first step, the gas in the first tank body is supplied to a gas consuming device through a first gas supply pipe by bringing the first gas tank into the first state. In the second step, the first gas tank is brought from the first state to the second state after the gas amount in the first tank body is reduced to less than a predetermined reference a amount. In the step, the first gas tank is brought from the second state to the third state after the gas in the first gas supply pipe has been consumed by the gas consuming device and the pressure of the gas in the first gas supply pipe has been reduced to less than a predetermined reference pressure.

4 Claims, 4 Drawing Sheets

(56) References Cited

U.S. PATENT DOCUMENTS

| | | | |
|---|---|---|---|
| 2019/0140291 A1* | 5/2019 | Namba | H01M 8/04559 |
| 2020/0217456 A1* | 7/2020 | Francois | F17C 1/005 |
| 2022/0410701 A1 | 12/2022 | Mei | |
| 2023/0115169 A1 | 4/2023 | Mei et al. | |

FOREIGN PATENT DOCUMENTS

| | | |
|---|---|---|
| JP | 2023-056951 A | 4/2023 |
| JP | 2023-056952 A | 4/2023 |

* cited by examiner

METHOD FOR DISCONNECTING GAS TANK

CROSS-REFERENCE TO RELATED APPLICATION

This application claims priority to Japanese Patent Application No. 2024-037991 filed on Mar. 12, 2024, incorporated herein by reference in its entirety.

BACKGROUND

1. Technical Field

The technology disclosed herein relates to a method for replacing a gas tank.

2. Description of Related Art

Japanese Unexamined Patent Application Publication No. 2023-056952 (JP 2023-056952 A) discloses a gas tank connected to a gas supply pipe. The gas tank of JP 2023-056952 A is configured to supply gas to a gas consuming device through the gas supply pipe.

SUMMARY

In the configuration of JP 2023-056952 A, when removing the gas tank connected to the gas supply pipe from the gas supply pipe, noise may be generated due to pressure of the gas remaining in the gas supply pipe. The present specification provides a technology capable of suppressing generation of noise when removing a gas tank from a gas supply pipe.

An aspect of the present technology is a method for replacing a gas tank.

A gas supply device includes a plurality of gas tanks connected to a plurality of gas supply pipes. The gas supply device is configured to supply gas to a gas consuming device from the gas tanks through the gas supply pipes.

A first gas tank that is one of the plurality of gas tanks is configured to supply the gas to the gas consuming device through a first gas supply pipe that is one of the plurality of gas supply pipes.

The first gas tank includes a first tank body that stores the gas to be supplied to the gas consuming device in a high-pressure state, and a first on-off valve that is configured to open or close a gas supply port of the first tank body and is connected to the first gas supply pipe.

The first gas tank is configured to make transition to:
a first state in which the gas in the first tank body is supplied to the gas consuming device through the first gas supply pipe by opening the first on-off valve with the first on-off valve connected to the first gas supply pipe;
a second state in which the gas in the first tank body is not supplied to the gas consuming device by closing the first on-off valve with the first on-off valve connected to the first gas supply pipe; and
a third state in which the first on-off valve is disconnected from the first gas supply pipe with the first on-off valve closed.

The method for replacing the gas tank in the gas supply device may include:
supplying the gas in the first tank body to the gas consuming device through the first gas supply pipe by bringing the first gas tank to the first state;
bringing the first gas tank from the first state to the second state after an amount of the gas in the first tank body decreases to an amount less than a predetermined reference amount after the supplying of the gas; and
bringing the first gas tank from the second state to the third state after the gas in the first gas supply pipe is consumed by the gas consuming device and a pressure of the gas in the first gas supply pipe decreases to a pressure lower than a predetermined reference pressure after the bringing of the first gas tank from the first state to the second state.

With this configuration, when removing the first gas tank from the first gas supply pipe, the first gas tank can be removed after the pressure of the gas remaining in the first gas supply pipe decreases. Thus, it is possible to suppress the generation of noise due to the pressure of the gas in the first gas supply pipe when removing the first gas tank.

In the above aspect,
the gas consuming device may be a fuel cell configured to generate electric power by consuming the gas, and may be configured to supply the generated electric power to a power consuming device.

The power consuming device may be configured to consume the electric power supplied from the fuel cell and electric power supplied from a storage battery different from the fuel cell.

The method may include supplying the electric power from the storage battery to the power consuming device without supplying the electric power from the fuel cell to the power consuming device when the first gas tank is in the second state after the bringing of the first gas tank from the first state to the second state.

In the above aspect,
the gas supply device may include a movement device configured to move the first gas tank. The movement device may be configured to cause the first gas tank to make transition to the first state, the second state, or the third state by moving the first gas tank.

In the above aspect,
a second gas tank that is one of the plurality of gas tanks may be configured to supply the gas to the gas consuming device through a second gas supply pipe that is one of the plurality of gas supply pipes.

The second gas tank may include a second tank body that stores the gas to be supplied to the gas consuming device in a high-pressure state, and a second on-off valve that is configured to open or close a gas supply port of the second tank body and is connected to the second gas supply pipe.

The second gas tank may be configured to make transition to
a first state in which the gas in the second tank body is supplied to the gas consuming device through the second gas supply pipe by opening the second on-off valve with the second on-off valve connected to the second gas supply pipe.

The method may further include
bringing the second gas tank to the first state after the gas in the first gas supply pipe is consumed by the gas consuming device and the pressure of the gas in the first gas supply pipe decreases to a pressure lower than the reference pressure after the bringing of the first gas tank from the first state to the second state.

In the above aspect,
the first gas supply pipe may be provided with a first check valve.

The second gas supply pipe may be provided with a second check valve.

The first gas supply pipe on a downstream side of the first check valve and the second gas supply pipe on a downstream side of the second check valve may merge with each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
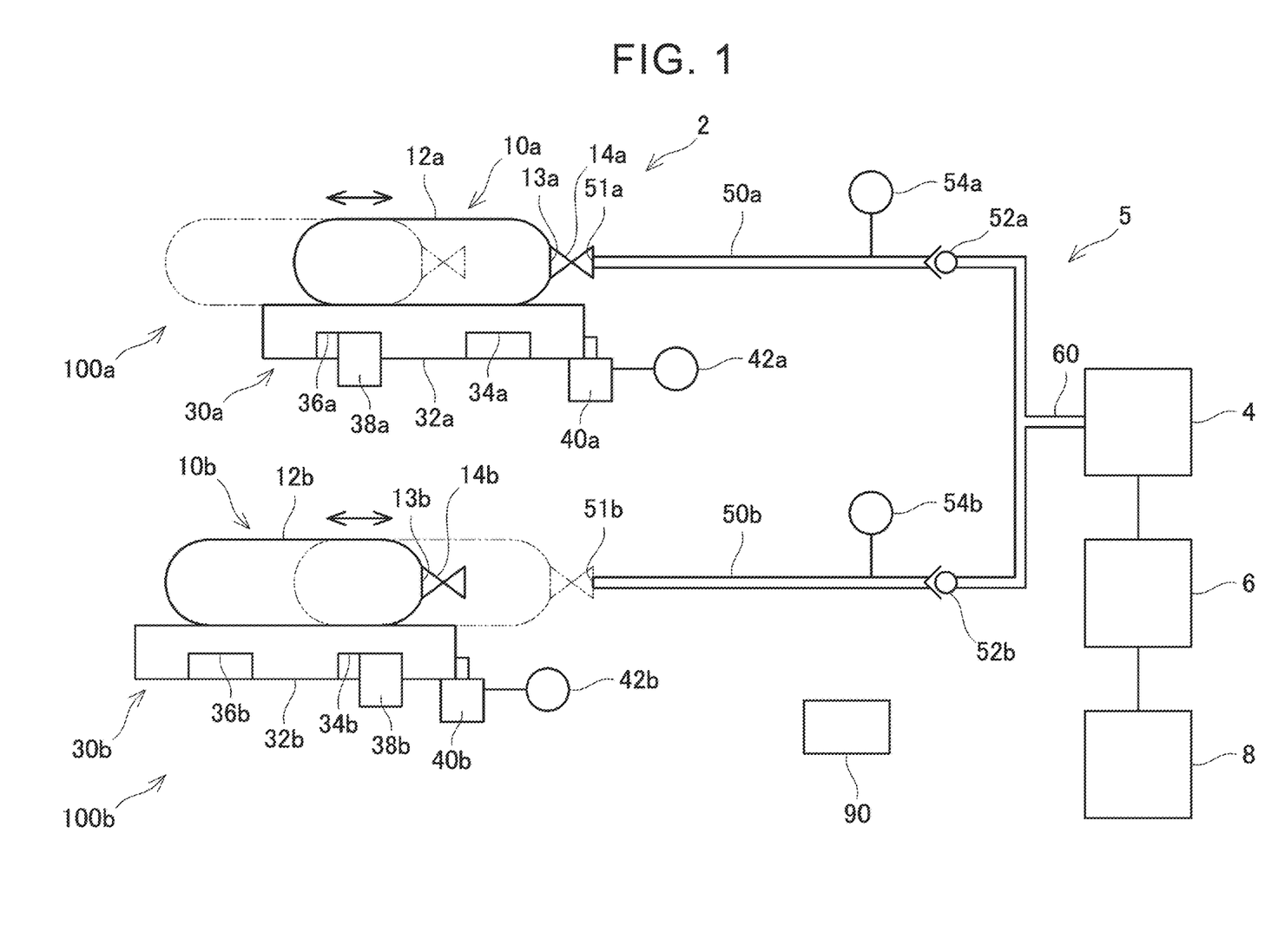
FIG. 1 is a diagram schematically illustrating a gas supply device according to an embodiment.

The gas supply device 2 of the embodiment will be described with reference to the drawings. As shown in FIG. 1, the gas supply device 2 of the embodiment includes a plurality of tank units (in the present embodiment, the first tank unit 100a and the second tank unit 100b) and a control device 90. The gas supply device 2 is a device that supplies gas to the gas consuming device 4 through the gas supply pipe 5. The gas supplied to the gas consuming device 4 is, for example, hydrogen gas or oxygen gas. The gas supply device 2 may include three or more tank units.

The gas consuming device 4 is, for example, a fuel cell that consumes gas and generates electric power. The gas consuming device 4 is connected to a gas supply pipe 5. The gas consuming device 4 (fuel cell) may be electrically connected to the power consuming device 6. The gas consuming device 4 (fuel cell) is configured to be capable of supplying power generated by consuming gas to the power consuming device 6. The type of the gas consuming device 4 and the type of the gas are not particularly limited.

The power consuming device 6 is, for example, an electrified vehicle motor that consumes power and operates. The power consuming device 6 consumes power supplied from the gas consuming device 4 (fuel cell). The power consuming device 6 may be electrically connected to a storage battery 8 different from the gas consuming device 4 (fuel cell). The storage battery 8 is configured to be capable of supplying electric power stored therein to the power consuming device 6. The power consuming device 6 consumes power supplied from the storage battery 8. The storage battery 8 is, for example, a lithium-ion battery.

The gas supply pipe 5 includes a first gas supply pipe 50a, a second gas supply pipe 50b, and a common gas supply pipe 60. The gas supply device 2 introduces gas into the first gas supply pipe 50a from the inlet 51a of the first gas supply pipe 50a. Similarly, the gas supply device 2 introduces the gas into the second gas supply pipe 50b from the inlet 51b of the second gas supply pipe 50b. The inlet 51a of the first gas supply pipe 50a is opened to the outside when the first gas tank 10a to be described later is not connected. Similarly, the inlet 51b of the second gas supply pipe 50b is opened to the outside when the second gas tank 10b to be described later is not connected.

The first gas supply pipe 50a is provided with a first check valve 52a and a first pressure sensor 54a. The first check valve 52a allows gas to flow from the upstream side (the first gas tank 10a side) to the downstream side (the gas consuming device 4 side) of the first gas supply pipe 50a, and prohibits gas from flowing from the downstream side to the upstream side.

The first pressure sensor 54a is provided on the upstream side (the first gas tank 10a side) of the first check valve 52a. The first pressure sensor 54a detects the pressure of the gas in the first gas supply pipe 50a upstream of the first check valve 52a. The pressure detected by the first pressure sensor 54a is transmitted to the control device 90.

The second gas supply pipe 50b is provided with a second check valve 52b and a second pressure sensor 54b. The second check valve 52b and the second pressure sensor 54b have the same configuration as the first check valve 52a and the first pressure sensor 54a, respectively, and thus detailed explanation thereof is omitted.

The first gas supply pipe 50a and the second gas supply pipe 50b merge at their downstream ends. The first gas supply pipe 50a on the downstream side of the first check valve 52a and the second gas supply pipe 50b on the downstream side of the second check valve 52b merge. The first gas supply pipe 50a and the second gas supply pipe 50b are connected to the common gas supply pipe 60 at their downstream ends. The downstream end of the common gas supply pipe 60 is connected to the gas consuming device 4. The common gas supply pipe 60 supplies the gas sent from the first gas supply pipe 50a or the second gas supply pipe 50b to the gas consuming device 4.

Next, the first tank unit 100a will be described. The second tank unit 100b has the same configuration as the first tank unit 100a. Therefore, in the following description, the first tank unit 100a will be mainly described, and the second tank unit 100b will be given the same reference numerals as in the first tank unit 100a, and detailed description thereof may be omitted. The configuration of the first tank unit 100a is denoted by "a", and the configuration of the second tank unit 100b is denoted by "b".

The first tank unit 100a includes a first gas tank 10a and a first movement device 30a that moves the first gas tank 10a. The first gas tank 10a includes a first tank body 12a and a first on-off valve 14a. The first tank body 12a stores the gas (for example, hydrogen gas) supplied to the gas consuming device 4 at a high pressure. The first tank body 12a is connected to the first gas supply pipe 50a via the first on-off valve 14a.

The first on-off valve 14a is provided on the gas-supply port 13a of the first tank body 12a. The first on-off valve 14a opens and closes the gas-supply port 13a of the first tank body 12a. The first on-off valve 14a is connected to the first gas supply pipe 50a when the gas is supplied from the first gas tank 10a to the gas consuming device 4.

When the first on-off valve 14a is connected to the first gas supply pipe 50a, it seals the inlet 51a of the first gas supply pipe 50a. When the first on-off valve 14a is opened in this condition, the gas in the first tank body 12a is supplied to the gas consuming device 4 through the first gas supply pipe 50a. In a state in which the first on-off valve 14a is not connected to the first gas supply pipe 50a (that is, a state in which it is separated from the first gas supply pipe 50a), the inlet 51a of the first gas supply pipe 50a is opened.

The first on-off valve 14a opens when the first gas tank 10a is in the first position (i.e., in the first condition), which will be described later. On the other hand, the first on-off valve 14a is closed when the first gas tank 10a is in the second position (i.e., in the second condition), which will be described later. The first on-off valve 14a is closed when the first gas tank 10a is in the third position (that is, in the third position) described later.

In the first gas tank 10a, the first on-off valve 14a is opened in a state in which the first on-off valve 14a is connected to the first gas supply pipe 50a (that is, in a state in which the first on-off valve 14a seals the inlet 51a of the first gas supply pipe 50a). Accordingly, the gas in the first tank body 12a can be supplied to the gas consuming device 4 through the first gas supply pipe 50a. On the other hand, when the first on-off valve 14a is closed while the first on-off valve 14a is connected to the first gas supply pipe 50a, the gas in the first tank body 12a is not supplied to the gas consuming device 4.

The configuration for opening and closing the first on-off valve 14a is not particularly limited. For example, the first on-off valve 14a may be configured to open when the member inside the valve is pushed by the inlet 51a of the first gas supply pipe 50a. In this case, the first on-off valve 14a may be configured to close the valve when the inlet 51a of the first gas supply pipe 50a does not push the member inside the valve.

The first gas tank 10a having the above-described configuration can be transitioned between a first state, a second state, and a third state. In the first condition, gas is supplied from the first gas tank 10a to the gas consuming device 4. The first on-off valve 14a is opened while the first on-off valve 14a of the first gas tank 10a is connected to the first gas supply pipe 50a. Thus, the first state is a state in which the gas in the first tank body 12a is supplied to the gas consuming device 4 through the first gas supply pipe 50a. In the first condition, the gas supplied from the first gas tank 10a is consumed by the gas consuming device 4. In the first condition, the first on-off valve 14a is connected to the first gas supply pipe 50a, so that the inlet 51a of the first gas supply pipe 50a is sealed. In the first state, the gas is supplied from the first gas tank 10a to the first gas supply pipe 50a, so that the pressure in the first gas supply pipe 50a is increased.

In the second condition, no gas is supplied from the first gas tank 10a to the gas consuming device 4. In the second state, the first on-off valve 14a is closed while the first on-off valve 14a is connected to the first gas supply pipe 50a, so that the gas in the first tank body 12a is not supplied to the gas consuming device 4. In the second condition, the gas remaining in the first gas supply pipe 50a is consumed by the gas consuming device 4. In the second condition, the first on-off valve 14a is connected to the first gas supply pipe 50a, so that the inlet 51a of the first gas supply pipe 50a is sealed. In the second condition, the gas remaining in the first gas supply pipe 50a is consumed by the gas consuming device 4, so that the pressure in the first gas supply pipe 50a gradually decreases.

In the third condition, no gas is supplied from the first gas tank 10a to the gas consuming device 4. In the third state, the first on-off valve 14a is disengaged from the first gas supply pipe 50a in a state where the first on-off valve 14a is closed. In the third condition, the first on-off valve 14a is separated from the first gas supply pipe 50a, whereby the inlet 51a of the first gas supply pipe 50a is opened without being sealed.

Next, a first movement device 30a of the first tank unit 100a will be described. The first movement device 30a includes a first movement table 32a, a first motor 40a, a first movement restricting member 38a, and a first position sensor 42a. The first movement device 30a may move the first gas tank 10a to a first position, a second position, and a third position. The first position is a position at which the first gas tank 10a is in the first condition described above. The second position is a position at which the first gas tank 10a is in the second state described above, and the third position is a position at which the first gas tank 10a is in the third state described above.

The first movement table 32a supports the first gas tank 10a while the first on-off valve 14a of the first gas tank 10a is directed toward the first gas supply pipe 50a. The first movement table 32a is moved by driving the first motor 40a while the first gas tank 10a is mounted. The first movement table 32a is driven by the first motor 40a so as to move toward the first gas supply pipe 50a or to move away from the first gas supply pipe 50a. The first motor 40a is, for example, a stepping motor.

The first movement table 32a includes a front side recessed portion 34a and a rear side recessed portion 36a into which the first movement restricting member 38a is inserted. The front side recessed portion 34a is provided closer to the first gas supply pipe 50a than the rear side recessed portion 36a.

The first movement restricting member 38a is configured to be movable up and down by driving of a solenoid. The first movement restricting member 38a is inserted into the front side recessed portion 34a or the rear side recessed portion 36a of the first movement table 32a by moving upward. When the first movement restricting member 38a is inserted into the front side recessed portion 34a or the rear side recessed portion 36a, the movement of the first movement table 32a is restricted. In the following, this state is sometimes referred to as a regulated state.

Further, the first movement restricting member 38a moves downward to exit from the front side recessed portion 34a or the rear side recessed portion 36a of the first movement table 32a. When the first movement restricting member 38a exits from the front side recessed portion 34a or the rear side recessed portion 36a, the restriction of the movement of the first movement table 32a is released. Hereinafter, this state may be referred to as a release state.

The first position sensor 42a is connected to, for example, the first motor 40a, and detects the position of the first movement table 32a by detecting the number of steps of the first motor 40a. The first position sensor 42a can detect the position of the first gas tank 10a by detecting the position of the first movement table 32a. The position detected by the first position sensor 42a is transmitted to the control device 90.

The control device 90 includes, for example, a CPU, ROM, a RAM, and the like, and executes various controls and processes related to the gas supply device 2 in accordance with predetermined programming. For example, the control device 90 controls the first movement device 30a and the second movement device 30b to move the first gas tank 10a and the second gas tank 10b. Accordingly, the first gas tank 10a and the second gas tank 10b are transitioned.

Figure 2:
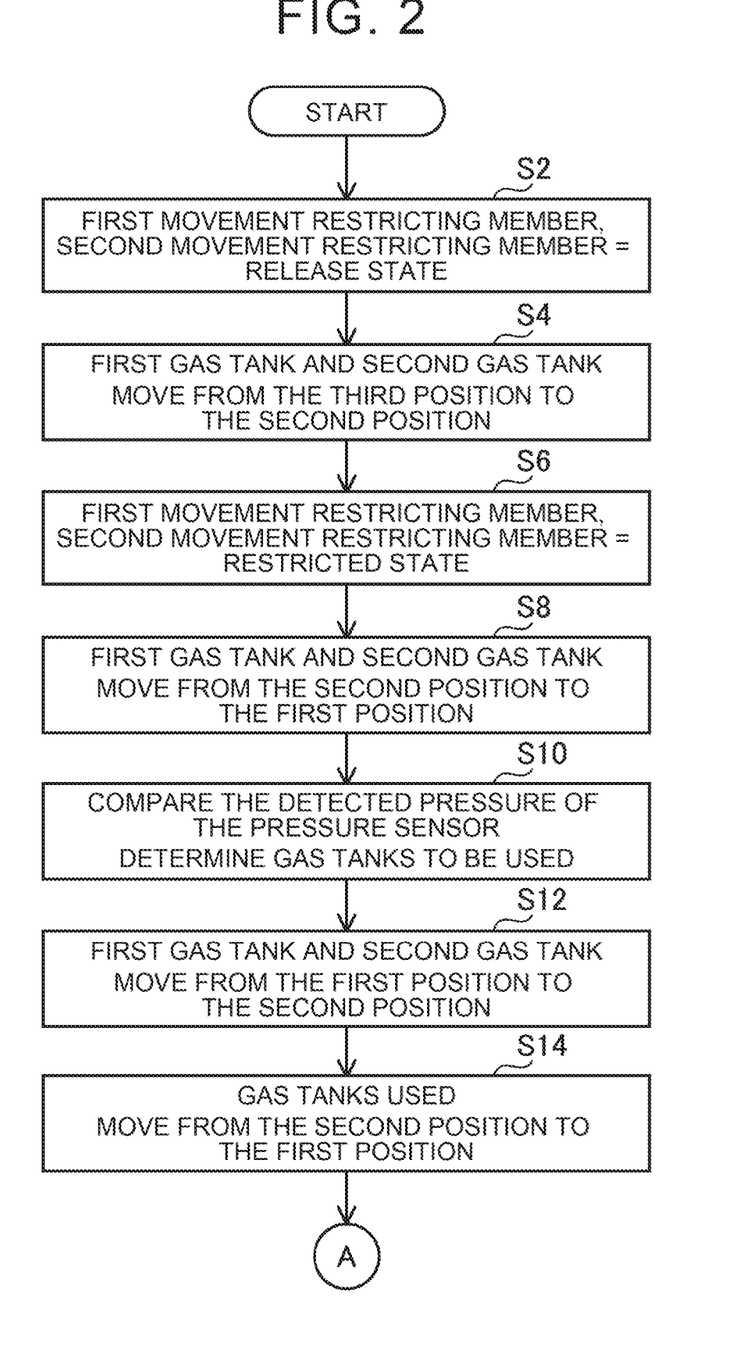
FIG. 2 is a flowchart (1) illustrating a method of replacing a gas tank according to an embodiment.
Figure 3:
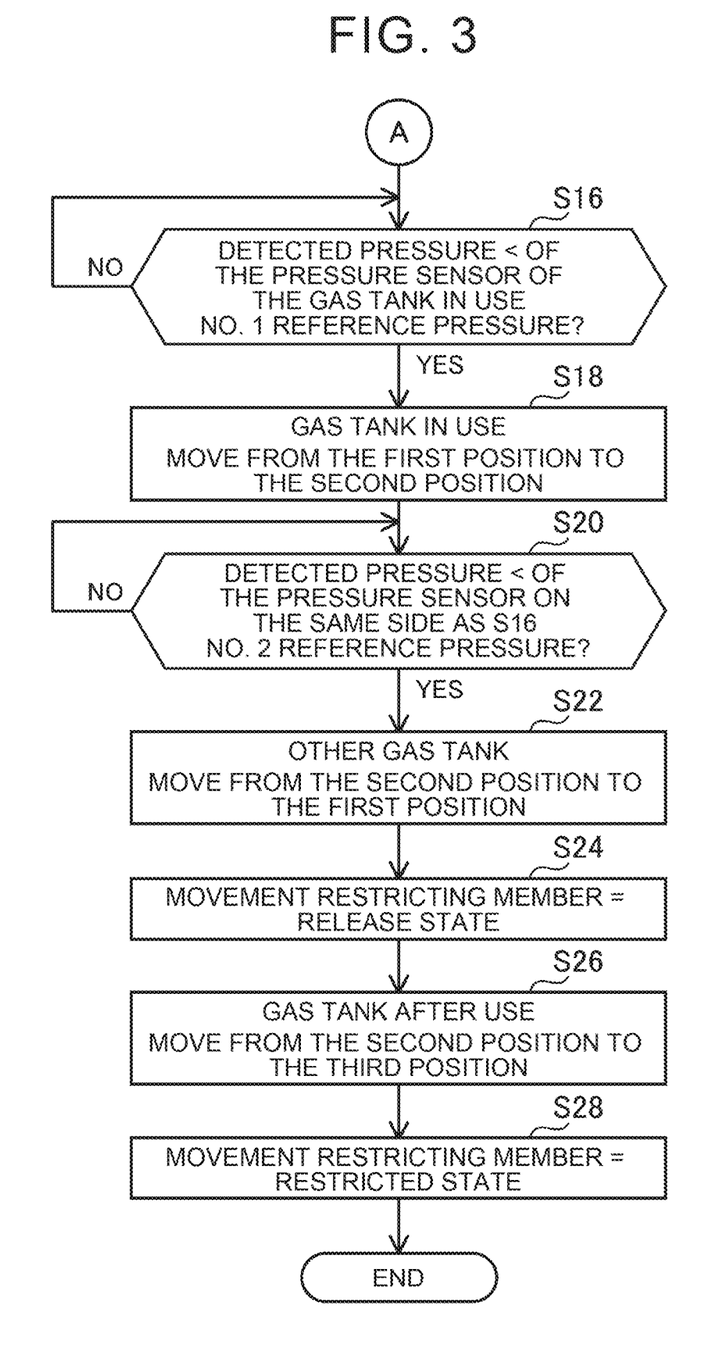
FIG. 3 is a flow chart (2) illustrating a process for replacing a gas tank according to an embodiment of the present disclosure.
Figure 4:
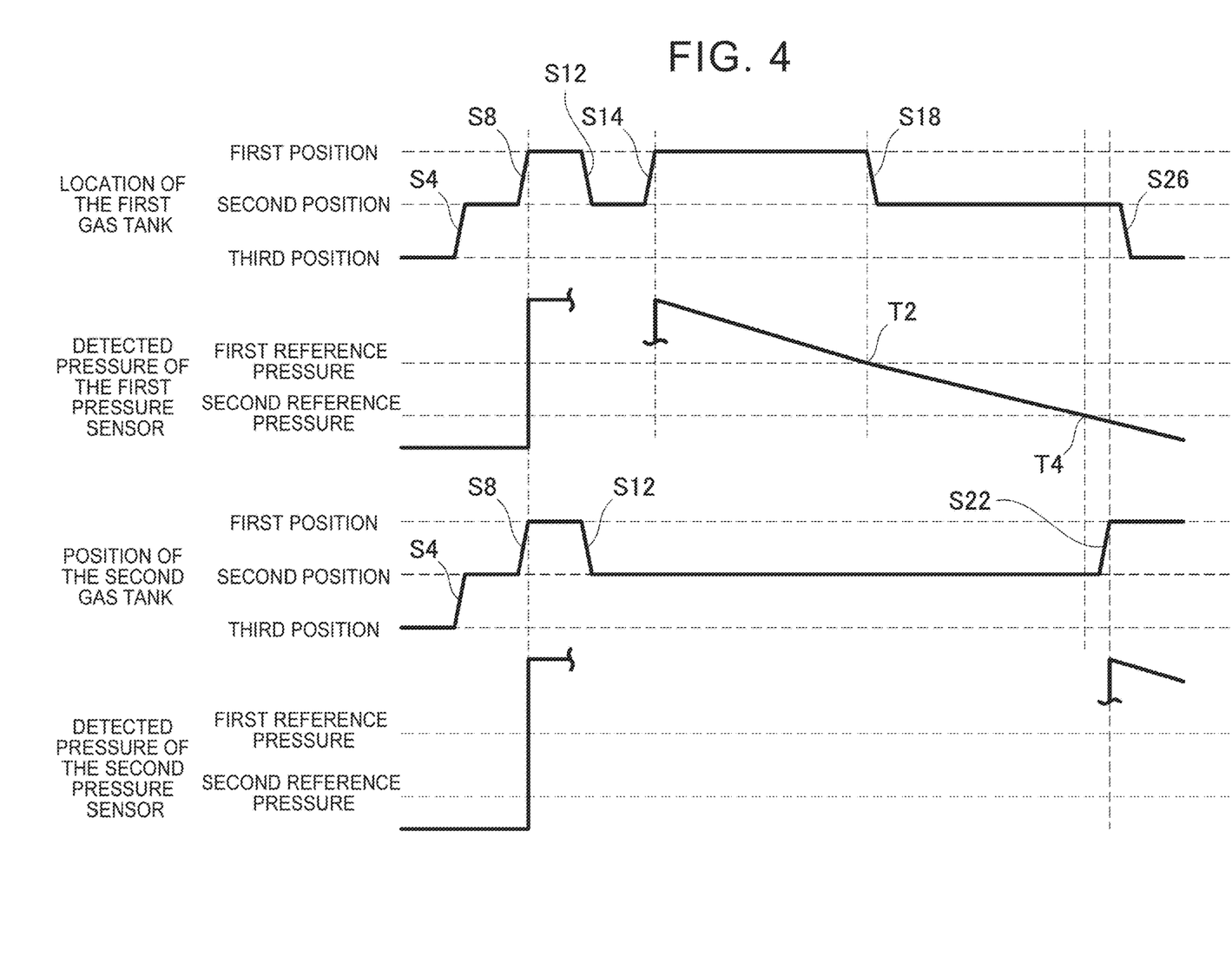
FIG. 4 is a sequence diagram illustrating a method of replacing a gas tank according to an embodiment.

Next, methods of exchanging the gas tank (the first gas tank 10a and the second gas tank 10b) in the gas supply device 2 will be described. FIG. 2 and FIG. 3 are flow charts illustrating a method of replacing a gas tank, and FIG. 4 is a sequence diagram illustrating a method of replacing a gas tank. In the initial state of the embodiment, it is assumed that the first gas tank 10a and the second gas tank 10b are in the third position (that is, the third state).

As shown in FIG. 2, in S2 of the embodiment, the first movement device 30a of the gas supply device 2 sets the first movement restricting member 38a to the released state, and the second movement device 30b sets the second movement restricting member 38b to the released state.

As shown in FIGS. 2 and 4, in a subsequent S4, the first movement device 30a and the second movement device 30b move the first gas tank 10a and the second gas tank 10b from the third position to the second position (that is, transition from the third state to the second state), respectively. When the first gas tank 10a and the second gas tank 10b are in the second condition, the first gas tank 10a is connected to the first gas supply pipe 50a, and the second gas tank 10b is connected to the second gas supply pipe 50b (see FIG. 1).

In the following S6, the first movement device 30a and the second movement device 30b regulate the first movement restricting member 38a and the second movement restricting member 38b, respectively.

In a subsequent S8, the first movement device 30a and the second movement device 30b move the first gas tank 10a and the second gas tank 10b from the second position to the first position (i.e., transit from the second state to the first state), respectively. When the first gas tank 10a is in the first condition, the first on-off valve 14a is opened, and the gas is supplied from the first gas tank 10a into the first gas supply pipe 50a. Similarly, when the second gas tank 10b is in the first condition, the second on-off valve 14b is opened, and the gas is supplied from the second gas tank 10b into the second gas supply pipe 50b.

Subsequently, in S10, the control device 90 compares the detected pressure of the first pressure sensor 54a with the detected pressure of the second pressure sensor 54b (that is, compares the pressure of the gas in the first gas supply pipe 50a with the pressure of the gas in the second gas supply pipe 50b). Then, the control device 90 determines 10a, 10b of gas tanks to be used based on the comparison. For example, the control device 90 determines to use the first gas tank 10a when the detected pressure of the first pressure sensor 54a is lower than the detected pressure of the second pressure sensor 54b. Alternatively, the control device 90 determines to use the second gas tank 10b when the detected pressure of the second pressure sensor 54b is lower than the detected pressure of the first pressure sensor 54a. In the present embodiment, it is assumed that the first gas tank 10a is used.

In a subsequent S12, the first movement device 30a and the second movement device 30b move the first gas tank 10a and the second gas tank 10b from the first position to the second position (i.e., transit from the first state to the second state), respectively. When the first gas tank 10a is in the second state, the first on-off valve 14a is closed, and when the second gas tank 10b is in the second state, the second on-off valve 14b is closed.

As shown in FIG. 3, in a subsequent S14, the first movement device 30a moves the first gas tank 10a determined to be used in S10 from the second position to the first position (i.e., transitions from the second state to the first state). On the other hand, the second movement device 30b keeps the unused second gas tank 10b in the second position (i.e., the second condition).

When the gas tank to be used (the first gas tank 10a in the present embodiment) is in the first condition, the first on-off valve 14a is opened, and the gas is supplied from the first gas tank 10a to the gas consuming device 4 through the first gas supply pipe 50a. Further, when the gas is consumed by the gas consuming device 4, the quantity of the gas in the first tank body 12a of the first gas tank 10a is decreased, and the pressure of the gas in the first gas supply pipe 50a is gradually decreased.

Subsequently, in S16, the control device 90 monitors whether or not the detected pressure of the pressure sensor on the gas tank-side in use falls below a predetermined first reference pressure. In the present embodiment, in S16, the control device 90 monitors whether or not the detected pressure of the first pressure sensor 54a on 10a of the first gas tank falls below a predetermined first reference pressure. The detected pressure of the first pressure sensor 54a on the first gas tank 10a is the pressure of the gas in the first gas supply pipe 50a. If the detected pressure of the first pressure sensor 54a drops below the first reference pressure (YES at S16), the process proceeds to S18 and if not dropped below the first reference pressure (NO at S16), the process waits at S16. When the detected pressure of the first pressure sensor 54a falls below the first reference pressure (see T2 of FIG. 4), it means that the amount of gas in the first tank body 12a of the first gas tank 10a falls below a predetermined reference amount.

In S18 after YES in S16, the first movement device 30a moves the in-use first gas tank 10a from the first position to the second position (i.e., transitions from the first state to the second state). Here, even if the first gas tank 10a in use moves to the second position (that is, transitions to the second state), the gas still remains in the first gas supply pipe 50a immediately after that. Therefore, the gas remaining in the first gas supply pipe 50a is supplied to the gas consuming device 4, and the gas is consumed by the gas consuming device 4. When the gas remaining in the first gas supply pipe 50a is consumed by the gas consuming device 4, the pressure of the gas in the first gas supply pipe 50a gradually decreases.

Subsequently, in S20, the control device 90 monitors whether or not the detected pressure of the first pressure sensor 54a (that is, the pressure of the gas in the first gas supply pipe 50a) on the same side as the above-described S16 falls below the predetermined second reference pressure. The second reference pressure is a pressure that is less than the first reference pressure in S16. If the detected pressure of the first pressure sensor 54a drops below the second reference pressure (YES at S20), the process proceeds to S22, and if not dropped below the second reference pressure (NO at S20), the process waits at S20. When the detected pressure of the first pressure sensor 54a falls below the second reference pressure (see T4 of FIG. 4), it means that the quantity of the gas remaining in the first gas supply pipe 50a has sufficiently decreased.

Subsequently, in S22, the second movement device 30b moves the other unused gas tank (the second gas tank 10b in the present embodiment) from the second position to the first position (that is, transitions from the second state to the first state). When the second gas tank 10b is in the first condition, the second on-off valve 14b is opened, and the gas is supplied from the second gas tank 10b to the gas consuming device 4 through the second gas supply pipe 50b. Further, when the gas is consumed by the gas consuming device 4, the quantity of the gas in the second tank body 12b of the second gas tank 10b is decreased, and the pressure of the gas in the second gas supply pipe 50b is gradually decreased.

Subsequently, in S24, the first movement device 30a releases the first movement restricting member 38a. In a subsequent S26, the first movement device 30a moves the used first gas tank 10a from the second position to the third position (i.e., transitions from the second state to the third state). When the first gas tank 10a is in the third condition, the first on-off valve 14a is separated from the first gas supply pipe 50a. In the following S28, the first movement device 30a sets the first movement restricting member 38a to the restricting condition.

The gas supply device 2 and the method of replacing the gas tank according to the embodiment have been described above. As is obvious from the above explanation, in the replacement of the gas tank, the gas in the first gas supply pipe 50a is consumed by the gas consuming device 4. As a result, after the pressure of the gas in the first gas supply pipe 50a drops below the second reference pressure, the first gas tank 10a is brought from the second state to the third state (see S20, S26 of FIG. 3).

According to this configuration, when the first gas tank 10a is removed from the first gas supply pipe 50a, the first gas tank 10a can be removed after the pressure of the gas remaining in the first gas supply pipe 50a decreases. Accordingly, it is possible to suppress generation of noise caused by the pressure of the gas in the first gas supply pipe 50a when the first gas tank 10a is removed.

The gas supply device 2 includes a first movement device 30a that moves the first gas tank 10a. According to this configuration, it is possible to switch the status of the first gas tank 10a with little effort.

Further, in the method of replacing the gas tank, the gas in the first gas supply pipe 50a is consumed by the gas consuming device 4, so that the pressure of the gas in the first gas supply pipe 50a is reduced to less than the second reference pressure, and then the second gas tank 10b is put into the first state. According to this configuration, after the gas remaining in the first gas supply pipe 50a is consumed, the gas can be supplied to the gas consuming device 4 from the second gas tank 10b that differs from the first gas tank 10a.

In the configuration of the embodiment, the first gas supply pipe 50a on the downstream side of the first check valve 52a and the second gas supply pipe 50b on the downstream side of the second check valve 52b merge. According to this configuration, it is possible to reduce the gas supplied from the first gas tank 10a into the first gas supply pipe 50a from flowing backward through the second gas supply pipe 50b. Similarly, it is possible to reduce the gas supplied from the second gas tank into the second gas supply pipe 50b from flowing backward through the first gas supply pipe 50a.

Correspondence

The process of S14 of the embodiment (see FIG. 2) is an example of the "first step" described in the claims. Further, the process of S18 (see FIG. 3) is an example of the "second step", the process of S26 is an example of the "third step", and the process of S22 is an example of the "fourth step".

Modification

After S18 shown in FIG. 3, the first gas tank 10a may be in a second position (i.e., in a second condition). In this case, the control device 90 may supply power from the storage battery 8 to the power consuming device 6 without supplying power from the gas consuming device 4 (fuel cell) to the power consuming device 6. For example, the control device 90 switches the switches to cut off the energization between the gas consuming device 4 (fuel cell) and the power consuming device 6, and to energize the storage battery 8 and the power consuming device 6.

When the gas consuming device 4 is a fuel cell and the first gas tank 10a is in the second state after S18, the fuel cell is in a state in which power is generated by consuming the gas remaining in the first gas supply pipe 50a. In this state, it is considered that the power generation amount of the fuel cell is small. Therefore, at this time, by supplying power from the storage battery 8 to the power consuming device 6 without supplying power from the fuel cell to the power consuming device 6, sufficient power can be supplied to the power consuming device 6.

Although specific examples of the disclosure have been described in detail above, the examples are merely examples and do not limit the scope of claims. The technique described in the claims includes various modifications and variations of the specific examples exemplified above. The technical elements described in this specification or in the drawings exhibit technical utility alone or in various combinations, and are not limited to the combinations described in the claims at the time of filing. Further, the technology illustrated in the present specification or the drawings can achieve a plurality of objects at the same time, and has technical usefulness by achieving one of the objects.

What is claimed is:

1. A method for disconnecting a gas tank, the gas tank being included in a gas supply device that includes a plurality of gas tanks connected to a plurality of gas supply pipes and is configured to supply gas to a fuel cell from the plurality of gas tanks through the gas supply pipes,
   the fuel cell being configured to generate electric power by consuming the gas, and being configured to supply the generated electric power to a power consuming device,
   the power consuming device being configured to consume the electric power supplied from the fuel cell and electric power supplied from a storage battery different from the fuel cell,
   a first gas tank that is one of the plurality of gas tanks being configured to supply the gas to the fuel cell through a first gas supply pipe that is one of the plurality of gas supply pipes,
   the first gas tank including a first tank body that stores the gas to be supplied to the fuel cell in a high-pressure state, and a first on-off valve that is configured to open or close a gas supply port of the first tank body and is connected to the first gas supply pipe,
   the first gas tank being configured to make transition to:
      a first state in which the gas in the first tank body is supplied to the fuel cell through the first gas supply pipe by opening the first on-off valve with the first on-off valve connected to the first gas supply pipe;
      a second state in which the gas in the first tank body is not supplied to the fuel cell by closing the first on-off valve with the first on-off valve connected to the first gas supply pipe; and
      a third state in which the first on-off valve is disconnected from the first gas supply pipe with the first on-off valve closed,
   the method comprising:
   supplying the gas in the first tank body to the fuel cell through the first gas supply pipe by bringing the first gas tank to the first state;
   bringing the first gas tank from the first state to the second state after an amount of the gas in the first tank body decreases to an amount less than a predetermined reference amount after the supplying of the gas;
   bringing the first gas tank from the second state to the third state after the gas in the first gas supply pipe is consumed by the fuel cell and a pressure of the gas in the first gas supply pipe decreases to a pressure lower than a predetermined reference pressure after the bringing of the first gas tank from the first state to the second state; and
   supplying the electric power from the storage battery to the power consuming device without supplying the electric power from the fuel cell to the power consuming device when the first gas tank is in the second state after the bringing of the first gas tank from the first state to the second state.

2. The method according to claim 1, wherein:

a second gas tank that is one of the plurality of gas tanks is configured to supply the gas to the fuel cell through a second gas supply pipe that is one of the plurality of gas supply pipes;

the second gas tank includes a second tank body that stores the gas to be supplied to the fuel cell in a high-pressure state, and a second on-off valve that is configured to open or close a gas supply port of the second tank body and is connected to the second gas supply pipe;

the second gas tank is configured to make transition to a first state in which the gas in the second tank body is supplied to the fuel cell through the second gas supply pipe by opening the second on-off valve with the second on-off valve connected to the second gas supply pipe; and the method further includes bringing the second gas tank to the first state after the gas in the first gas supply pipe is consumed by the fuel cell and the pressure of the gas in the first gas supply pipe decreases to a pressure lower than the reference pressure after the bringing of the first gas tank from the first state to the second state.

3. The method according to claim 2, wherein:

the first gas supply pipe is provided with a first check valve;

the second gas supply pipe is provided with a second check valve; and the first gas supply pipe on a downstream side of the first check valve and the second gas supply pipe on a downstream side of the second check valve merge with each other.

4. A method for disconnecting a gas tank, the gas tank being included in a gas supply device that includes a plurality of gas tanks connected to a plurality of gas supply pipes and is configured to supply gas to a gas consuming device from the gas tanks through the gas supply pipes, a first gas tank that is one of the plurality of gas tanks being configured to supply the gas to the gas consuming device through a first gas supply pipe that is one of the plurality of gas supply pipes, the first gas tank including a first tank body that stores the gas to be supplied to the gas consuming device in a high-pressure state, and a first on-off valve that is configured to open or close a gas supply port of the first tank body and is connected to the first gas supply pipe, the first gas tank being configured to make transition to:
a first state in which the gas in the first tank body is supplied to the gas consuming device through the first gas supply pipe by opening the first on-off valve with the first on-off valve connected to the first gas supply pipe;
a second state in which the gas in the first tank body is not supplied to the gas consuming device by closing the first on-off valve with the first on-off valve connected to the first gas supply pipe; and
a third state in which the first on-off valve is disconnected from the first gas supply pipe with the first on-off valve closed, the gas supply device including a movement device configured to move the first gas tank, the movement device being configured to cause the first gas tank to make transition to the first state, the second state, or the third state by moving the first gas tank, the method comprising:

supplying the gas in the first tank body to the gas consuming device through the first gas supply pipe by bringing the first gas tank to the first state;

bringing the first gas tank from the first state to the second state after an amount of the gas in the first tank body decreases to an amount less than a predetermined reference amount after the supplying of the gas; and bringing the first gas tank from the second state to the third state after the gas in the first gas supply pipe is consumed by the gas consuming device and a pressure of the gas in the first gas supply pipe decreases to a pressure lower than a predetermined reference pressure after the bringing of the first gas tank from the first state to the second state.

* * * * *